United States Patent
Kodera et al.

(10) Patent No.: US 10,407,824 B2
(45) Date of Patent: Sep. 10, 2019

(54) AIR BAG BASE CLOTH, AIR BAG, AND METHOD FOR MANUFACTURING AIR BAG BASE CLOTH

(71) Applicant: SEIREN CO., LTD., Fukui-shi, Fukui (JP)

(72) Inventors: Shota Kodera, Fukui (JP); Kohichi Sakashita, Fukui (JP)

(73) Assignee: SEIREN CO., LTD., Fukui-Shi (JP)

( * ) Notice: Subject to any disclaimer, the term of this patent is extended or adjusted under 35 U.S.C. 154(b) by 0 days.

(21) Appl. No.: 15/764,449

(22) PCT Filed: Sep. 26, 2016

(86) PCT No.: PCT/JP2016/078324
§ 371 (c)(1),
(2) Date: Mar. 29, 2018

(87) PCT Pub. No.: WO2017/057299
PCT Pub. Date: Apr. 6, 2017

(65) Prior Publication Data
US 2018/0274167 A1    Sep. 27, 2018

(30) Foreign Application Priority Data
Sep. 30, 2015 (JP) .................. 2015-195240

(51) Int. Cl.
*D06N 3/00* (2006.01)
*B60R 21/235* (2006.01)
(Continued)

(52) U.S. Cl.
CPC ......... *D06N 3/0006* (2013.01); *B60R 21/235* (2013.01); *D03D 1/02* (2013.01);
(Continued)

(58) Field of Classification Search
CPC ........... B60R 2021/23514; B60R 2021/23542; B60R 21/235; D03D 13/008; D03D 15/00;
(Continued)

(56) References Cited

U.S. PATENT DOCUMENTS 5,277,966 A    1/1994  Nakayama et al.
5,713,598 A    2/1998  Morita et al.
(Continued)

FOREIGN PATENT DOCUMENTS

JP    5-156545 A    6/1993
JP    5-262193 A    10/1993
(Continued)

OTHER PUBLICATIONS

International Search Report for PCT/JP2016/078324 dated Dec. 27, 2016.
(Continued)

*Primary Examiner* — Arti Singh-Pandey
(74) *Attorney, Agent, or Firm* — Birch, Stewart, Kolasch & Birch, LLP (57) ABSTRACT

An air bag base cloth according to the present invention includes a synthetic fiber fabric constituted by warp and weft that are constituted by synthetic fibers, and a synthetic resin layer that coats at least one surface of the synthetic fiber fabric, and only threads in one of the warp and the weft of the synthetic fiber fabric are exposed from the synthetic resin layer.

11 Claims, 4 Drawing Sheets

(51) Int. Cl.
  *D03D 1/02* (2006.01)
  *D03D 15/00* (2006.01)
  *D06M 15/643* (2006.01)
  *D03D 13/00* (2006.01)

(52) U.S. Cl.
  CPC ........... *D03D 13/008* (2013.01); *D03D 15/00* (2013.01); *D06M 15/643* (2013.01); *B60R 2021/23514* (2013.01); *B60R 2021/23542* (2013.01); *D10B 2331/04* (2013.01); *D10B 2505/124* (2013.01)

(58) Field of Classification Search
  CPC ..... D03D 1/02; D06M 15/643; D06N 3/0006; D10B 2331/04; D10B 2505/124

See application file for complete search history.

(56) References Cited

U.S. PATENT DOCUMENTS

| | | | |
|---|---|---|---|
| 2010/0260976 A1* | 10/2010 | Kano | B60R 21/235 428/172 |
| 2015/0247283 A1* | 9/2015 | Akechi | B60R 21/235 442/60 |
| 2016/0207492 A1* | 7/2016 | Akechi | B60R 21/235 |
| 2017/0136982 A1* | 5/2017 | Akechi | B60R 21/235 |

FOREIGN PATENT DOCUMENTS

| | | |
|---|---|---|
| JP | 6-8779 A | 1/1994 |
| JP | 2002-363835 A | 12/2002 |
| JP | 2006-306312 A | 11/2006 |

OTHER PUBLICATIONS

Written Opinion of the International Searching Authority for PCT/JP2016/078324 dated Dec. 27, 2016.

* cited by examiner

|  | Work. Ex. 1 | Work. Ex. 2 | Work. Ex. 3 | Comp. Ex. 1 | Comp. Ex. 2 |
|---|---|---|---|---|---|
| Fiber type | polyester | nylon | nylon | nylon | nylon |
| Total fineness [T/f] | 470/144 | 470/72 | 350/72 | 470/72 | 470/72 |
| Weave density [#/in] | 46/46 | 46/46 | 63/60 | 46/46 | 46/46 |
| Texture | plain weave | plain weave | plain weave | plain weave | plain weave |
| Resin applying amount [g/m$^2$] | 25 | 25 | 25 | 25 | 30 |
| Resin amount ratio [%] | 108 | 175 | 107 | 103 | 103.5 |
| Initial tensile resistance [N/tex] | 8 | 5 | 5 | 5 | 5 |
| Warp coating determination | A | A | A | B | B |
| Weft coating determination | B | B | B | B | B |
| Seal adhesion | A | A | A | D | C |
| Resin applying method | knife-on-bed | gravure printing (dot pattern) | knife-on-bed | knife-on-bed | knife-on-bed |

AIR BAG BASE CLOTH, AIR BAG, AND METHOD FOR MANUFACTURING AIR BAG BASE CLOTH

TECHNICAL FIELD

The present invention relates to an air bag base cloth, an air bag including the same, and a method for manufacturing an air bag base cloth.

BACKGROUND ART

In recent years, an air bag device has become prevalent as a safety device for occupant protection that protects an occupant from impact when a vehicle undergoes a collision. The air bag device has the function of quickly expanding in a space between the occupant and an interior structure during collision, and absorbing the impact when the occupant directly collides with an instrument panel, a side door, a handle, or the like. Thus, in general, the air bag device includes a sensor that detects a sudden deceleration when receiving impact such as collision of a vehicle, an inflator that produces high pressure gas for expansion in response to reception of a signal from a sensor, an air bag body that expands, and deploys using high pressure gas for expansion from the inflator so as to reduce impact on an occupant, and a diagnostic circuit that determines whether or not an air bag system is functioning normally.

Also, in recent years, many vehicles provided with curtain airbags that expand and deploy along the side surfaces of the vehicle in the vehicle interior have been used in order to protect the head of an occupant in an accident such as a side collision accident against a vehicle or a rollover (for example, Patent Literature 1). This curtain air bag operates as follows. Specifically, when the occurrence of an accident such as a side collision accident against a vehicle or a rollover is detected, or when the occurrence of these accidents is predicted, inflation gas ejected from an inflator flows into the curtain air bag, and expands and deploys the curtain air bag.

In order to absorb impact on the head of the occupant, this curtain air bag needs to hold the inner pressure for a long period of time such as several seconds while the vehicle is rolling over, and in order to increase the airtightness of the air bag, sewing portions of the curtain air bag are often sealed using a sealing material so as to increase the airtightness. For example, when two base cloths are stacked and sewn, a sealing material that is to adhere to a synthetic resin is applied along a sewing line.

CITATION LIST

Patent Literature

Patent Literature 1: JP 2006-306312A

SUMMARY OF INVENTION

Technical Problem

Incidentally, in order to secure the adhesiveness with a sealing material, a synthetic resin of a curtain air bag base cloth in which the sealing material is used needs to contain resin in a certain amount or more, and the resin amount cannot be reduced easily. That is, if the resin amount at the surface is low, the adherence with the sealing material becomes poor, and a problem arises that the airtightness cannot be maintained.

The following problems also arise. A safety device (referred to as "module" hereinafter) such as an air bag device is constituted by many constituent parts, and as a result, the weight of the modules provided in a vehicle also increases. Thus, innovations have been made to the constituent parts of the modules to reduce the weight and the size thereof.

Although a reduction in the weight of the constituent parts of the modules of an air bag, a bag attachment jig, and the like has been implemented, a reduction in the weight of an air bag base cloth has not advanced much. In particular, the adherence between a sealing curtain air bag base cloth and a sealing material is important, and the sealing curtain air bag base cloth needs to contain a minimum required amount of resin, and thus a reduction in the weight of a base cloth has not been realized yet.

For example, Patent Literature 1 above discloses a method by which the weight of an air bag is reduced by reducing the number of filaments of fiber bundles by using flattened fibers, but does not lead to a significant reduction in the weight. Also, from the fact that only part of the fiber bundles have flattened threads, there was a low possibility that Patent Literature 1 had an effect of reducing the weight of an air bag.

An object of the present invention is to provide an air bag base cloth that enables producing an air bag having a reduced amount of a synthetic resin without impairing the adhesiveness in sealing capability, an air bag including the same, and a method for manufacturing an air bag base cloth.

Solution to Problem

An air bag base cloth according to the present invention includes a synthetic fiber fabric constituted by warp and weft that are constituted by synthetic fibers and a synthetic resin layer that coats at least one surface of the synthetic fiber fabric, in which only threads in one of the warp and the weft of the synthetic fiber fabric are exposed from the synthetic resin layer.

In the air bag base cloth, a weight of the synthetic resin that is attached to threads that are not exposed from the synthetic resin layer can be 105% or more with respect to a weight of the synthetic resin that is attached to threads that are exposed from the synthetic resin layer.

In the air bag base cloths, the warp and the weft that constitute the synthetic fiber fabric can have an initial tensile resistance of 7 to 15 N/tex.

In the air bag base cloths, in the synthetic fiber fabric, a weave density of the threads that are exposed from the synthetic resin layer can be lower than a weave density of threads that are not exposed therefrom.

In the air bag base cloth, a weight of the synthetic resin layer per unit area can be 10 g/m$^2$ to 40 g/m$^2$.

An air bag according to the present invention includes at least one of the above-described air bag base cloths.

The air bag can include a pair of the air bag base cloths, in which the pair of air bag base cloths can be stacked such that the synthetic resin layers of the pair of air bag base cloths face each other, be fixed to each other using a sealing material, and be sewn passing through the sealing material.

In the air bag, the sealing material can be formed into a linear shape.

A method for manufacturing an air bag base cloth according to the present invention includes a step of preparing a synthetic fiber fabric constituted by warp and weft that are constituted by synthetic fibers, and a step of coating one surface of the synthetic fiber fabric with a synthetic resin layer such that only one of the warp and the weft of the synthetic fiber fabric is exposed.

In the method for manufacturing an air bag base cloth, the warp and the weft that constitute the synthetic fiber fabric can have an initial tensile resistance of 7 to 15 N/tex.

In the methods for manufacturing an air bag base cloth, in the synthetic fiber fabric, a weave density of threads that are exposed from the synthetic resin layer can be lower than a weave density of threads that are not exposed from the synthetic resin layer.

Advantageous Effects of Invention

According to the present invention, it is possible to produce an air bag having a reduced amount of a synthetic resin without impairing the adhesiveness in sealing capability.

DESCRIPTION OF EMBODIMENTS

Figure 1:
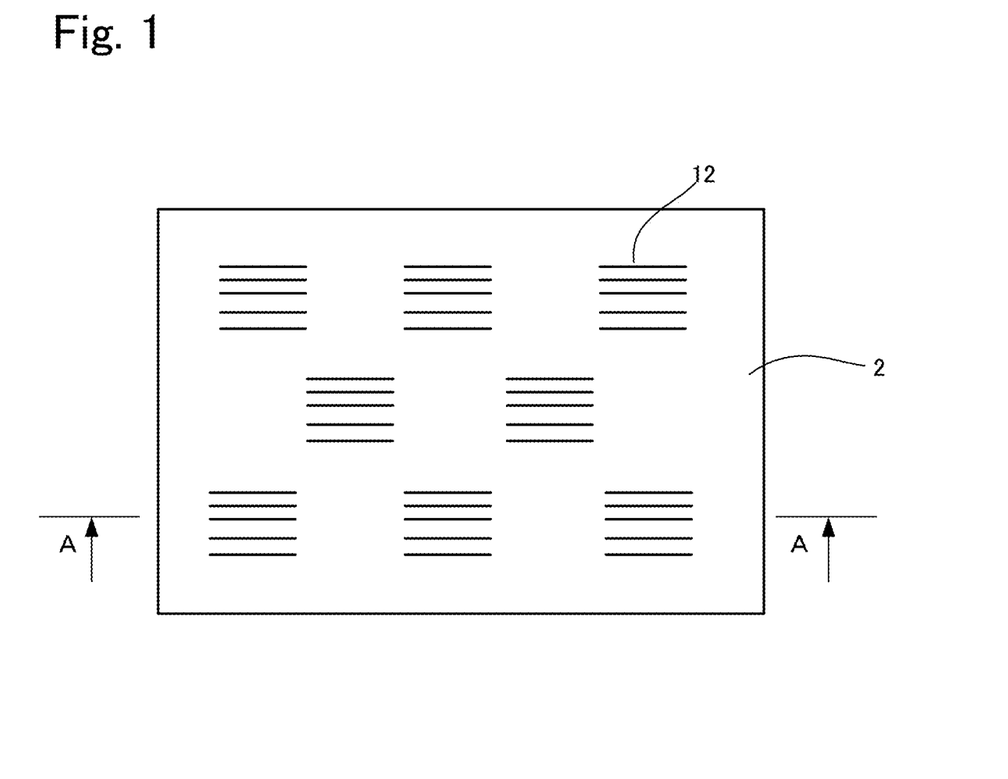
FIG. 1 is a plan view of an air bag base cloth according to one embodiment of the present invention.
Figure 2:
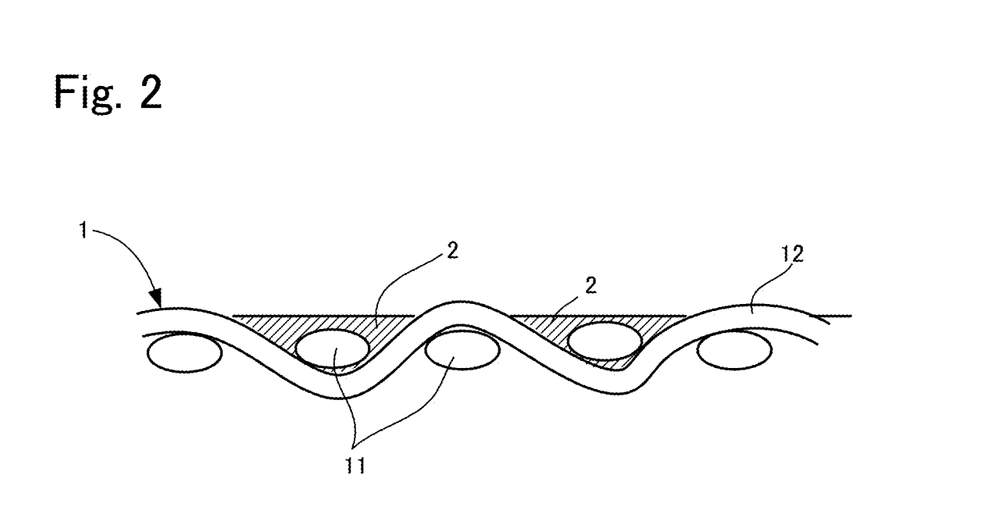
FIG. 2 is a cross-sectional view taken along a line A-A in FIG. 1.

Hereinafter, an embodiment of an air bag base cloth according to the present invention, an embodiment of an airbag including this air bag base cloth, and an embodiment of a method for manufacturing the air bag base cloth will be described with reference to the drawings. FIG. 1 is a plan view of an air bag base cloth according to the present embodiment, and FIG. 2 is a partial cross-sectional view taken along a line A-A in FIG. 1. Hereinafter, an air bag base cloth will be described using the directions in FIG. 1 to simplify the description, but the present invention is not limited to these directions.

1. Air Bag Base Cloth

As shown in FIGS. 1 and 2, an air bag base cloth according to the present embodiment includes a synthetic fiber fabric 1 and a synthetic resin layer that is constituted by a synthetic resin 2 that coats one surface of this synthetic fiber fabric 1 (top surface in FIG. 2). Moreover, one of warp 11 and weft 12 that constitute the synthetic fiber fabric 1 is exposed from the surface of the synthetic resin 2 that coats the synthetic fiber fabric 1, and the other is covered by the synthetic resin 2 and thus is not visible. Although a mode in which the weft 12 is exposed from the synthetic resin 2 and the warp 11 is covered by the synthetic resin will be described as one example hereinafter, of course, it is possible to reverse this. Although one surface of the synthetic fiber fabric 1 is coated with the synthetic resin 2 in the examples in FIGS. 1 and 2, both surfaces can also be coated therewith. Hereinafter, each member will be described in detail.

1-1. Synthetic Fiber Fabric

The synthetic fiber fabric 1 in the present invention means a fabric woven using a synthetic fiber yarn. The fabric is excellent in mechanical strength and excellent in terms of being able to be thin in thickness. There is no particular limitation on the fabric texture, and examples thereof include a plain weave, a twill weave, a satin weave, variations thereof, and a multi-axial weave. Among these, a plain weave having an excellent mechanical strength is particularly preferable.

There is no particular limitation on the type of synthetic fiber yarn, and examples thereof include polyamide fibers such as nylon 66, nylon 6, nylon 12, and nylon 46; polyester fibers such as polyethylene terephthalate and polybutylene terephthalate; polyolefin fibers such as polyethylene and polypropylene; polyvinyl alcohol fibers; polyvinylidene chloride fibers; polyvinyl chloride fibers; polyacrylonitrile-based fibers such as acrylic fibers; polyurethane fibers; aromatic polyamide fibers; and polyparaphenylene benzobisoxazole (PBO) fibers. Among these, polyamide fibers and polyester fibers are preferable due to reasons of excellent heat resistance and ease of manufacture. More preferably, using polyester fibers that are unlikely to stretch strengthens the tension in the warp direction of the fabric at the time of processing, and the warp digs into the weft, and a base cloth surface having a region in which one of the warp and the weft is completely coated with a synthetic resin can be obtained by applying a resin in this base cloth state.

In particular, a material having an initial tensile resistance (JIS L1013 8.10) of 7 to 15 N/tex is preferably selected as the synthetic fiber yarn.

There is no particular limitation on the mode of yarn, and examples thereof include a filament yarn, a spun yarn, a union yarn, a combined filament yarn, a twisted union yarn, and a wound yarn. Among these, a non-twisted or loosely twisted filament yarn is preferable due to reasons of the productivity, cost, and excellent mechanical strength, and because a low breathability can be easily obtained due to spread of a single yarn. There is no particular limitation on the cross-sectional shape of a single yarn (also referred to "single fiber"), and examples thereof include round, flattened, triangle, rectangle, parallelogram, hollow, and star. A round cross section is preferable in terms of the productivity and cost, and a flattened cross section is preferable in terms of a good air bag storability because the thickness of the cloth can be made thin.

The single yarn strength (tensile strength) is preferably 5.4 g/dtex or more and more preferably 7.0 g/dtex or more. If the single yarn strength is less than 5.4 g/dtex, there is a risk that it will be difficult to satisfy the physical properties of an air bag.

The total fineness of the yarn is preferably 155 to 700 dtex and more preferably 235 to 550 dtex. If the total fineness is less than 155 dtex, there is a risk that it will be difficult to maintain the strength of the cloth. If the total fineness exceeds 700 dtex, the thickness of the cloth increases and the air bag storability deteriorates.

Also, in the present invention, the density of the warp and the density of the weft in the fabric are not necessarily required to be the same, and a fabric woven with different densities of the warp and the weft can be adopted. In this case, the lower number of threads is preferably 80% or more of the higher number of threads, and more preferably 90% or more.

1-2. Synthetic Resin

Examples of the synthetic resin 2 that coats the synthetic fiber fabric include halogen-containing rubbers such as chloroprene rubber, Hypalon rubber, and fluororubber, rubbers such as silicone rubber, ethylene propylene rubber, ethylene propylene terpolymer rubber, nitrile butadiene rubber, styrene butadiene rubber, isobutylene isoprene rubber, urethane rubber, and acrylic rubber, halogen-containing resins such as vinyl chloride resins, vinylidene chloride resins, chlorinated polyolefin resins, and fluororesins, and resins such as urethane resins, acrylic resins, ester resins, amide resins, olefin resins, and silicone resins, and these are used alone or in combination. Among these, silicone rubber and silicone resins are preferable in view of excellent flexibility, heat resistance, and weather resistance.

There is no particular limitation on the type of silicone compound, and silicone compounds that are generally commercially available, such as solvent-free type, solvent dilution type, and water dispersion type, can be used.

Also, in order to reduce the viscosity and reinforce a silicone coating film after the silicone film is hardened, the silicone compound may contain other polymer materials such as polyurethane compounds, acrylic compounds, and polyester compounds in the present invention. Furthermore, the silicone compound may contain additives such as a hardening agent, an adhesion improver, a filler, a reinforcing agent, a pigment, and a flame retardant auxiliary agent.

The amount of the synthetic resin 2 that covers the synthetic fiber fabric 1 is preferably 10 to 40 g/m$^2$ and more preferably 10 to 25 g/m$^2$. This is because if the amount of the synthetic resin is smaller than 10 g/m$^2$, an adhesion property between the synthetic resin and the sealing material decreases as will be described later, and if the amount of the synthetic resin is greater than 40 g/m$^2$, the weight cannot be reduced. Hereinafter, the amount of this synthetic resin will be referred to as "resin applying amount".

2. Method for Manufacturing Air Bag Base Cloth

An air bag base cloth according to the present invention is manufactured by applying the synthetic resin 2 to one side or both sides of the above-described synthetic fiber fabric 1. Although there is no particular limitation on the method for applying the synthetic resin 2, examples thereof include 1) a coating method (knife, kiss, reverse, comma, slot die, and slip coater, or the like), 2) an immersion method, 3) a printing method (screen, roll, rotary, gravure, or the like), 4) a transfer method (transfer), 5) a laminate method, and 6) a spraying method using a spray. Among these, a coating method is preferable in terms of a wide range of applying amounts that can be set.

Incidentally, as described above, in the air bag base cloth according to the present invention, the weft 12 is exposed from the synthetic resin 2, and the warp 11 is covered by the synthetic resin 2, and as one method for achieving this, a configuration is adopted in which the weft 12 rises to the surface side of the synthetic fiber fabric 1 in the synthetic fiber fabric 1 and the warp 11 sinks in the inner portion of the synthetic fiber fabric 1. If the synthetic fiber fabric 1 has such a mode, the sunken warp 11 is covered by the synthetic resin 2, and the risen weft 12 is not covered even though the synthetic resin 2 is applied, and the risen weft 12 is exposed from the surface of the synthetic resin 2.

Moreover, in order for the weft 12 to rise to the surface side of the synthetic fiber fabric 1, and the warp 11 to sink in the inner portion of the synthetic fiber fabric 1 in this manner, for example, the synthetic fiber fabric 1 can be configured as (1) or (2) below.

(1) If a material in which the initial tensile resistance (JIS L1013 8.10) of the synthetic fiber yarn is 7 to 15 N/tex is used, for example, when the synthetic fiber fabric is woven, either the warp or the weft tends to rise toward the surface of the synthetic fiber fabric because the synthetic fiber yarn is hard. Note that if the initial tensile resistance is smaller than 7 N/tex, one of the warp and the weft is unlikely to rise, whereas if the initial tensile resistance is greater than 15 N/tex, the storability of the air bag deteriorates because the threads are excessively hard, and thus, these cases are not preferable. Polyethylene and polyester can be suitably used as a material having such an initial tensile resistance value, for example.

(2) If the warp and the weft have different densities (woven densities), the tensile force of the warp and the weft in the fabric becomes unbalanced. As a result, the tensile force becomes stronger in the direction in which the number of threads is higher, and the tensile force becomes weaker in the direction in which the number of threads is lower. This leads to a surface state in which the threads having a stronger tensile force dig into the threads having a weaker tensile force, and the threads having a weaker tensile force tend to rise to the surface side of the synthetic fiber fabric. However, the lower number of threads is preferably 80% or more of the higher number of threads. For example, if the number of threads of the warp in 2.54 cm is 59, the number of threads of the weft can be 59 to 47.

By applying (1) or (2), or both (1) and (2) above, one of the warp and the weft can easily rise. Note that if a synthetic fiber yarn as in (1) is used, even if the number of threads of the warp and the number of threads of the weft are the same, one of the warp and the weft tends to rise.

Also, another method for exposing the weft 12 from the synthetic resin 2 and covering the warp 11 with the synthetic resin 2 is a method of printing the synthetic resin 2 on the synthetic fiber fabric 1 such that the synthetic resin 2 is applied to only one of the warp and the weft of the synthetic fiber fabric 1. In this case, a printing plate having a dot pattern can be used such that the synthetic resin covers only one of the warp and the weft using gravure printing or the like, for example.

If one of the warp and the weft is covered by the synthetic resin and the other is exposed from the synthetic resin as described above, it is preferable that the ratio of the resin amount attached to threads that are covered by the synthetic resin 2 to the resin amount attached to threads that are exposed from the synthetic resin 2 is 105% or more. This is because if the ratio is smaller than 105%, the resin amount attached to the exposed threads is excessively high, and it will be difficult to realize a reduction in the weight. Hereinafter, this ratio is referred to as "resin amount ratio".

3. Production of Air Bag

Figure 3:
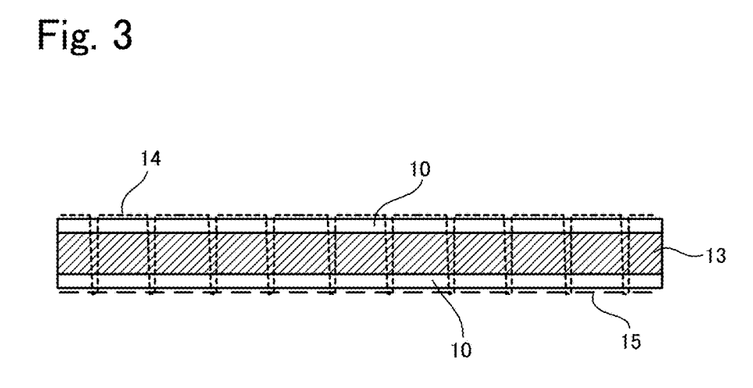
FIG. 3 is a cross-sectional view of an air bag.

An air bag base cloth having the above-described configuration is sealed and sewn as appropriate to produce an air bag, and after this air bag is folded, the folded air bag is attached to an inflator, and used as an airbag device for a driver/passenger seat, a curtain air bag device, a side air bag device, or the like. Specifically, an air bag can be produced as follows. For example, as shown in FIG. 3, the sealing material 13 is applied linearly to a surface of one air bag base cloth 10 on the synthetic resin side, another air bag base cloth 10 is placed thereon with the surface on the synthetic resin side facing the sealing material 13, and the two air bag base cloths 10 are fixed by the sealing material 13. Thereafter, by performing sewing on the sealing material 13, an air bag can be obtained. There is no particular limitation on the sewing technique, and sewing can be performed by lock stitch using a needle thread 14 and a bobbin thread 15, for example. In the example in FIG. 3, the bobbin thread 15 extends in a straight line by adjusting the stitch balancing thread tension.

It is sufficient that sewing 14 is performed using stitches that are applied to a general air bag, such as lock stitches, multi-thread chain stitches, one side down stitches, looping, safety stitches, zigzag stitches, flattened stitches, or the like. Also, it is sufficient that the fineness of the sewing thread is 235 dtex (corresponding to #50) to 2800 dtex (corresponding to #0), and the stitch count is 2 to 10 stitches/cm. If stitch lines with a plurality of columns is required, it is sufficient to use a multi-needle sewing machine with the distance between stitch lines being about 2.2 mm to 8 mm, but if the distance of the sewing portion is not long, sewing may be performed using a single-needle sewing machine a plurality of times.

Also, a silicone resin or silicone rubber can be used as the sealing material 13 that fixes the air bag base cloths, for example.

4. Features

According to an air bag base cloth having the above configuration, only one of the warp 11 and the weft 12 is exposed from the synthetic resin 2 and the other is covered by the synthetic resin 2, and thus, compared to the case where all of the threads are covered by the synthetic resin 2, the amount of the synthetic resin 2 can be reduced. Thus, it is possible to reduce the weight of the air bag base cloth and the weight of the air bag main body.

Also, even though the amount of the synthetic resin 2 is reduced, the synthetic resin 2 is applied in an amount sufficient to cover one of the warp and the weft, and therefore, if the sealing material is applied to the air bag base cloth, the sealing material can tightly adhere to the synthetic resin 2 of the air bag cloth, and separation of the sealing material can be prevented.

Note that only one of the warp 11 and the weft 12 is exposed from the synthetic resin 2, and the other is covered by the synthetic resin 2 so as not to be exposed therefrom in the above-described embodiment, but in the present invention, the other is not necessarily limited to the case of being completely not exposed, and can be slightly exposed as long as the above-described effects can be obtained. For example, threads that are to be covered by a resin are allowed to be exposed in 5% or less in plan view with respect to the area of threads that are exposed from the synthetic resin 2.

WORKING EXAMPLES

Hereinafter, working examples of the present invention will be described. However, the present invention is not limited to the working examples below.

A. Preparation of Working Examples and Comparative Examples

Here, air bag base cloths according to Working Examples 1 to 3 and Comparative Examples 1 and 2 were produced, and the surface properties and performance were evaluated. Hereinafter, details will be described.

First, in Working Examples 1 to 3 and Comparative Examples 1 and 2, the weave density and the total fineness of threads, the resin applying amount, and the resin amount ratio were measured as follows.

Method for Measuring Weave Density

The number of threads in the warp and the weft in 10 cm of the fabric was checked, and the number of threads in 2.54 cm was calculated.

Total Fineness of Threads

Measurement was performed in conformity with method B in JIS L 1013 8.3.1.

Resin Applying Amount

The resin applying amount was calculated using the differences between the weight before synthetic resin application and the weight after synthetic resin application. Specifically, 10 cm×10 cm pieces were cut from the synthetic fiber fabric before the synthetic resin was applied and the air bag base cloth after the synthetic resin was applied, and the resin applying amount in 1 $m^2$ was calculated using the weight difference before and after the synthetic resin was applied.

Resin Amount Ratio

A 10 cm×10 cm piece was cut from the air bag base cloth after the synthetic resin was applied, and then ten threads in the warp and ten threads in the weft were removed from the air bag base cloth. Thereafter, the ratio (%) of the amount of the resin (g/m) that was attached to threads that were coated with the synthetic resin to the amount of the resin (g/m) that was attached to threads that were exposed from the synthetic resin was obtained. That ratio was used as the resin amount ratio.

Next, the method for producing Working Examples 1 to 3 and Comparative Examples 1 and 2 will be described.

Working Example 1

Threads made of polyester fibers with a round cross section and having 470 dtex/144 filaments were woven as the warp and the weft, and a plain woven synthetic resin fabric in which the weave density of the warp was 46/2.54 cm and the weave density of the weft was 46/2.54 cm was obtained. Thereafter, that synthetic resin fabric was subjected to heat setting using a conventional method such that the weave density of the warp and the weave density of the weft were the same as that of greige.

Next, a solvent-free silicone resin having a viscosity of 15,000 mPa·s was prepared as the synthetic resin. Moreover, the synthetic resin fabric was held at a holding force of 2.5 N/cm and coated with the synthetic resin using a stainless steel knife having a blade thickness of 0.1 mm in a contact portion and a urethane bed. Thereafter, heat treatment was performed at 180° C. for 60 seconds using a pin tenter drying machine, and an air bag base cloth having a resin applying amount of 25 g/$m^2$ was obtained. The resin amount ratio was 108%.

Working Example 2

Differences from Working Example 1 were as follows, and matters not stated were the same as those of Working Example 1. Threads made of nylon fibers with a round cross section and having 470 dtex/72 filaments were woven as the warp and the weft, a plain woven synthetic fiber fabric in which the weave density of the warp was 46/2.54 cm and the weave density of the weft was 46/2.54 cm was obtained. Also, a solvent-free silicone resin having a viscosity of 15,000 mPa·s was prepared as the synthetic resin, and a dot pattern was transferred to the synthetic fiber fabric using a gravure printer. The resin amount ratio was 175%.

Working Example 3

Differences from Working Example 1 were as follows and matters not stated were the same as those of Working Example 1. Threads made of nylon 66 fibers with a round cross section and having 350 dtex/72 filaments was woven as the warp and the weft, and a plain woven synthetic fiber fabric in which the weave density of the warp was 63/2.54 cm and the weave density of the weft was 60/2.54 cm was obtained. The resin amount ratio was 107%.

Comparative Example 1

The synthetic fiber fabric was the same as in Working Example 2. Thereafter, a synthetic resin was applied using a method that was similar to that of Working Example 1. The resin amount ratio was 103%.

Comparative Example 2

The synthetic fiber fabric was the same as in Working Example 2. Thereafter, a synthetic resin was applied using a method that was similar to that of Working Example 1. Thereafter, a synthetic resin was applied using a method that was similar to that of Working Example 1 and the resin applying amount was 30 g/m². The resin amount ratio was 103.5%.

B. Evaluation

Next, as will be described below, resin coating determination and a seal adhesion test were performed on Working Examples 1 to 3 and Comparative Examples 1 and 2 above.

Resin Coating Determination

Surface properties of the working examples and comparative examples were observed using backscattered electron images (observation magnification was 50 times) by SEM. A state in which filaments in fiber bundles were completed coated with the synthetic resin and those filaments could not be visually confirmed was determined as "A". On the other hand, a state in which filaments were not completely coated with the synthetic resin and exposure of filaments in fiber bundles could be visually confirmed was determined as "B".

Seal Adhesion Test

Air bag base cloths (N=3) according to the above-described working examples and comparative examples were cut into 100 cm×10 cm pieces. Next, a silicone sealing material for an air bag (manufactured by Dow Corning Toray Co., Ltd., two liquid type, rupture elongation was 1600% or more) was applied to the cut air bag base cloth in the lengthwise direction at a position of 10 mm from one end of that cloth. Thereafter, the air bag base cloths that were cut into the same size were stacked and crimped such that the sealing material had a thickness of 1 mm and a width of 8 mm. Thereafter, those stacked cloths were cut at a width of 5 cm in a direction perpendicular to the applied seal and used as test pieces.

Thereafter, the test piece was opened vertically about the position to which the seal was applied, and the two ends of the test piece were held by upper and lower grips of Autograph (manufactured by SHIMADZU CORPORATION, AG-IS MO-type), and a peeling test was carried out under the conditions that the distance of the grips was 50 mm and the speed was 200 mm/min. Then, the CF ratio of the test pieces was calculated. Note that the CF ratio expresses the area ratio of the sealing material that undergoes cohesive failure in the samples on which the peeling test was carried out, and the "cohesive failure" refers to a case where the sealing material breaks. In contrast, a case where the sealing material separates from the surface of the air bag base cloth is referred to as "adhesive failure". That is, in a case where the area in which the sealing material ruptures is a cohesive failure area, and the area in which an interface between the sealing material and the air bag base cloth ruptures is an adhesive failure area, the ratio obtained by 100×(cohesive failure area)/(adhesive failure area+cohesive failure area) refers to the CF ratio, and a case where the CF ratio is 100% means that rupture occurs only in the sealing material layer.

Determination standards were such that a state in which the CF ratio was 100% was determined as "A". A state in which the CF ratio was 90% or more and less than 100% was determined as "B", a state in which the CF ratio was 60% or more and less than 90% was determined as "C", and a state in which the CF ratio was less than 60% was determined as "D". Note that for example, as with a curtain air bag, in order for the air bag base cloth to keep the inner pressure, there is a demand to prevent separation in the interface between the sealing material and the synthetic resin. Thus, if failure occurs, it is preferable that the sealing material undergoes cohesive failure.

Evaluation Results

Figure 4:
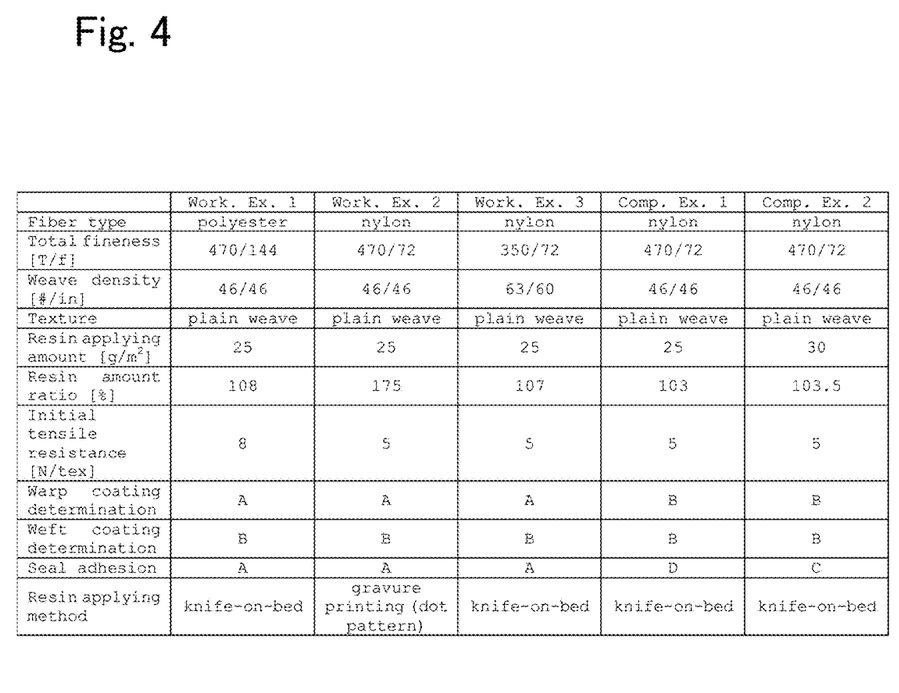
FIG. 4 is a table showing the properties and evaluation results of working examples and comparative examples.
Figure 5:
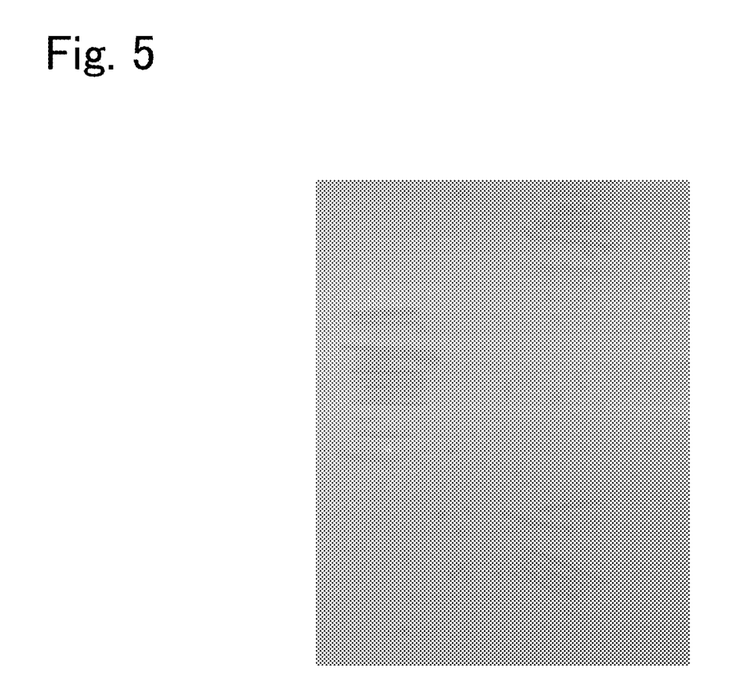
FIG. 5 is a photograph showing surface properties of Working Example 1.

The results are shown in FIG. 4. First, the results of the resin coating determination will be described. In Working Examples 1 to 3, the entirety of the warp of the synthetic fiber fabrics was completely coated with the synthetic resin and the entirety of the weft was exposed from the synthetic resin. A photograph of the surface properties of Working Example 1 is shown in FIG. 5 as an example. According to FIG. 5, it is understood that only the weft is exposed from the surface of the synthetic resin, and the warp is completely coated with the synthetic resin. Note that as indicated by the initial tensile resistance, it can be thought that in Working Example 1, due to a relatively hard polyester being used as fibers, the weft rose and became exposed from the synthetic resin. On the other hand, it can be thought that in Working Example 3, although nylon that was softer than polyester was used as the resin, the number (density) of threads in the warp and the number (density) of threads in the weft were different from each other, and thus the weft with a smaller number rose and became exposed from the synthetic resin.

Figure 6:
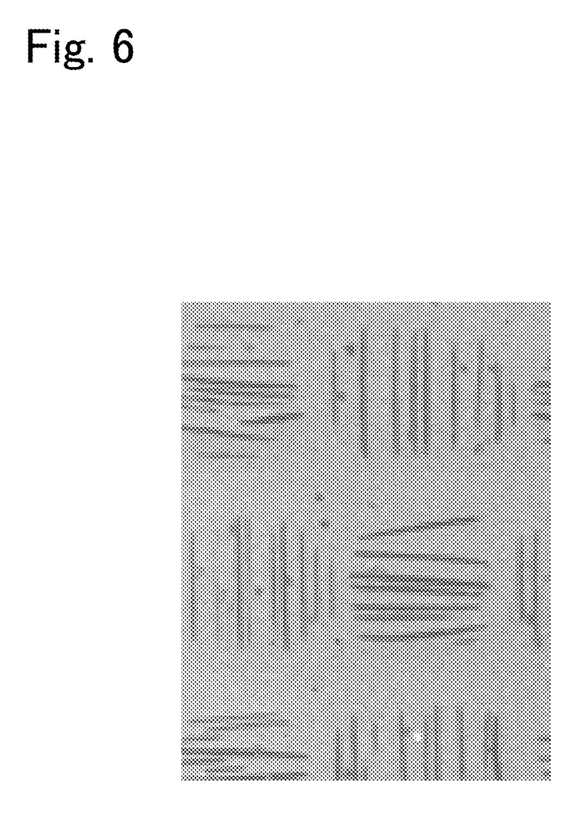
FIG. 6 is a photograph showing surface properties of Comparative Example 1.

On the other hand, in Comparative Examples 1 and 2, neither the warp nor the weft was completely coated with a resin, and both were exposed from the synthetic resin. A photograph of the surface properties of Comparative Example 1 is shown in FIG. 6 as an example. As shown in FIG. 6, in Comparative Example 1, both the warp and the weft are exposed from the synthetic resin. Note that it can be thought that although the resin applying amount of Comparative Example 1 was the same as that of Working Examples 1 to 3, a relatively soft nylon was used as a resin, and the warp and the weft were the same in number, and thus neither the warp nor the weft behaved in a rising manner. Also, the resin amount ratio was 105% or less in Comparative Examples 1 and 2, and thus it can be understood that both the warp and the weft were exposed from the synthetic resin.

Next, the results of the seal adhesion test will be described. In Working Examples 1 to 3, the adhesion strength of the air bag base cloth and the sealing material was good even though the resin applying amount was small, and all of the sealing materials underwent cohesive failure. Cohesive failure is most preferable mode as the separation failure mode. Here, the occurrence of cohesive failure means that the adhesion property between the sealing material and the synthetic resin is stronger than the separation strength of the sealing material in the interface of the air bag base cloth. It can be thought that this is because only the warp is exposed from the surface of the synthetic resin, and the ratio of the synthetic resin on the surface of the air bag base cloth was high and the synthetic resin adhered to a wider area of the sealing material.

On the other hand, in Comparative Example 1, both the warp and the weft were exposed from the synthetic resin and were not completely coated with the synthetic resin, and thus the adhesiveness with the sealing material was poor. That is, it was confirmed that the sealing material underwent interface separation in the interface between the air bag base cloth and the sealing material, instead of undergoing cohesive failure. In Comparative Example 2, both the warp and the weft were not completely coated with the synthetic resin, and the adhesiveness with the sealing material was poor. In the adhesion test, some of the sealing material underwent cohesive failure, but almost all of the sealing material underwent interface separation in the interface between the air bag base cloth and the sealing material.

LIST OF REFERENCE NUMERALS

1 Synthetic fiber fabric
11 Warp
12 Weft
2 Synthetic resin

The invention claimed is:

1. An air bag base cloth comprising:
a synthetic fiber fabric containing warp and weft that comprise synthetic fibers; and
a synthetic resin layer that coats at least one surface of the synthetic fiber fabric,
wherein only threads in one of the warp and the weft of the synthetic fiber fabric are exposed from the synthetic resin layer in a lattice or grid shape.

2. The air bag base cloth according to claim 1,
wherein a weight of the synthetic resin that is attached to threads that are not exposed from the synthetic resin layer is 105% or more with respect to a weight of the synthetic resin that is attached to threads that are exposed from the synthetic resin layer in a lattice or grid shape.

3. The air bag base cloth according to claim 1,
wherein the warp and the weft contained in the synthetic fiber fabric have an initial tensile resistance of 7 to 15 N/tex.

4. The air bag base cloth according to claim 1,
wherein in the synthetic fiber fabric, a weave density of the threads that are exposed from the synthetic resin layer in a lattice or grid shape is lower than a weave density of threads that are not exposed from the synthetic resin layer.

5. The air bag base cloth according to claim 1,
wherein a weight of the synthetic resin layer per unit area is 10 to 40 g/m$^2$.

6. An air bag comprising:
at least one air bag base cloth according to claim 1.

7. A method for manufacturing an air bag base cloth, comprising:
a step of preparing a synthetic fiber fabric containing warp and weft that comprise synthetic fibers; and
a step of coating one surface of the synthetic fiber fabric with a synthetic resin layer such that only one of the warp and the weft contained in the synthetic fiber fabric is exposed from the synthetic resin layer in a lattice or grid shape.

8. The method for manufacturing an air bag base cloth according to claim 7,
wherein the warp and the weft contained in the synthetic fiber fabric have an initial tensile resistance of 7 to 15 N/tex.

9. The method for manufacturing an air bag base cloth according to claim 1,
wherein in the synthetic fiber fabric, a weave density of threads that are exposed from the synthetic resin layer in a lattice or grid shape is lower than a weave density of threads that are not exposed from the synthetic resin layer.

10. The air bag base cloth according to claim 3, wherein the initial tensile resistance of 7 to 15 N/tex is determined by JIS L1013 8.10.

11. The method for manufacturing an air bag base cloth according to claim 8, wherein the initial tensile resistance of 7 to 15 N/tex is determined by JIS L1013 8.10.

* * * * *